G. S. JACOBS.
ATTACHMENT FOR AUTOMOBILES.
APPLICATION FILED MAY 23, 1917.

1,265,086.

Patented May 7, 1918.
2 SHEETS—SHEET 1.

Witness:
R. L. Farrington

Inventor:
George S. Jacobs,
By Glenn S. Noble
Att'y

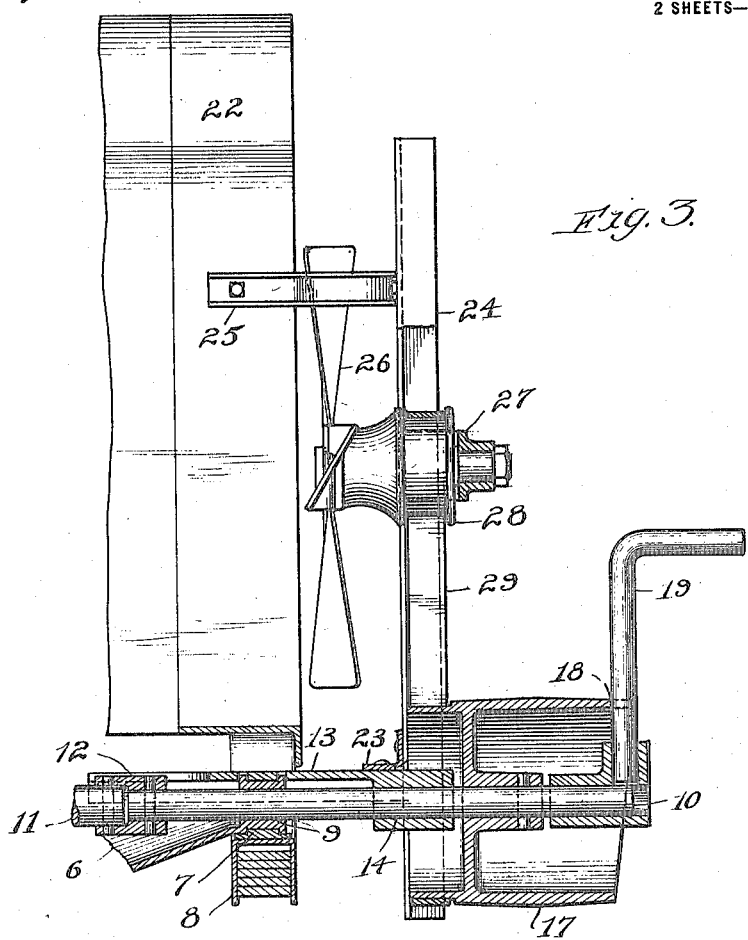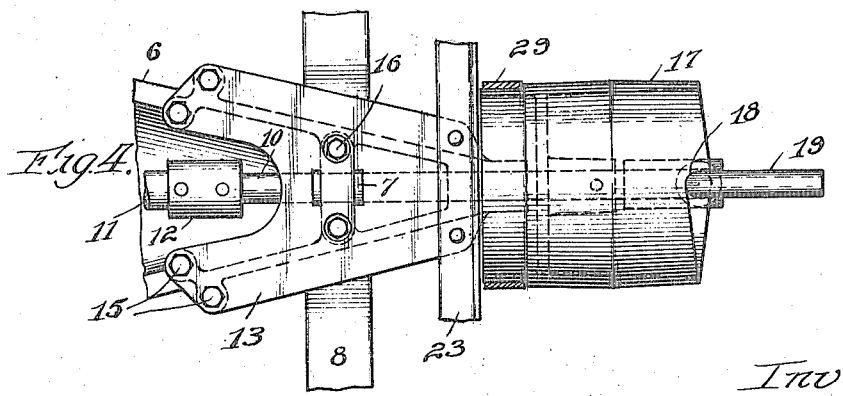

UNITED STATES PATENT OFFICE.

GEORGE S. JACOBS, OF PONTIAC, MICHIGAN, ASSIGNOR TO THE GENEVA TRACTOR COMPANY, OF GENEVA, OHIO.

ATTACHMENT FOR AUTOMOBILES.

1,265,086.  Specification of Letters Patent.  Patented May 7, 1918.

Application filed May 23, 1917. Serial No. 170,415.

*To all whom it may concern:*

Be it known that I, GEORGE S. JACOBS, a citizen of the United States, residing at Pontiac, Michigan, have invented certain new and useful Improvements in Attachments for Automobiles, of which the following is a specification.

It is frequently desirable to utilize the engine of an automobile for other purposes than driving the automobile. Power attachments have heretofore been proposed, but such attachments have usually been mounted on bearings supported from the frame of the car and extended out a considerable distance so that the belt used therewith would clear the front wheels in their ordinary position. I have found that such extended bearings attached to the frame are apt to vibrate if they are left on the car and, therefore, must be removed when the car is to be driven. In accordance with the present invention I provide a new and improved form of support which is attached directly to the engine base and is preferably extended a comparatively short distance to the front of the car, one of the front wheels being turned to permit the passage of the driving belt.

In utilizing automobiles for power or tractor purposes where the car is not driven at its normal speed, it is more or less difficult to keep the water cool so as to prevent the engine from becoming overheated. In accordance with my invention I provide my attachment with means for supporting and driving an auxiliary fan, or fan to replace the usual one supplied with the automobile.

In the accompanying drawings illustrating this invention:

Fig. 3 is a longitudinal sectional view showing the attachment in position; and, Fig. 4 is a detail plan view of the attachment.

Figure 1:
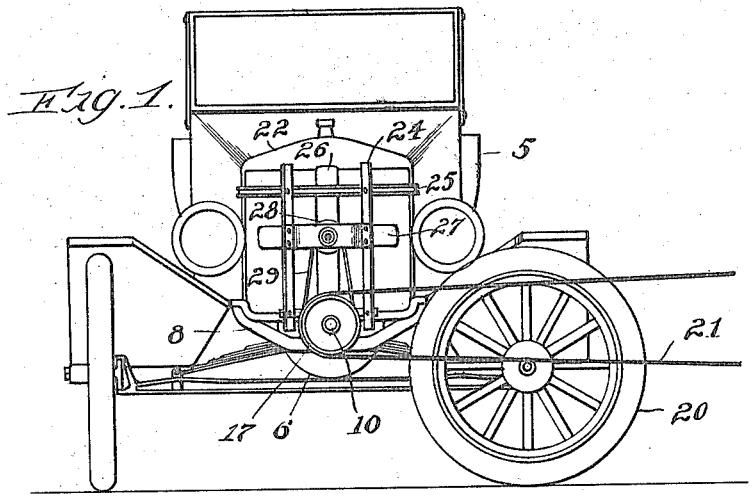
Figure 1 is a front view of an automobile showing my attachment applied thereto.
Figure 2:
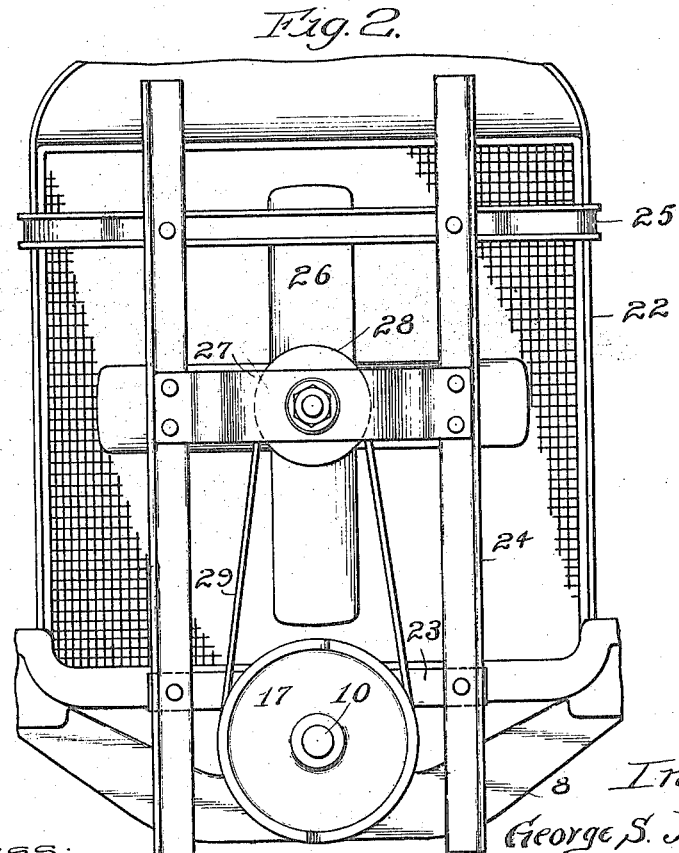
Fig. 2 is an enlarged front view of the attachment.

As illustrated in these drawings, 5 represents an automobile of any ordinary or preferred form of construction having an engine with a base 6. In the type of automobile shown, this base extends forwardly and its front end rests in a support 7 on the front cross piece 8 of the automobile frame. This forward part has a bearing 9 for the usual starting crank. This crank is dispensed with and I provide an extension shaft 10 which is coupled to the engine driving shaft 11 by means of any suitable coupling 12. In order to support the outer end of the shaft 10, I provide a bracket 13 having a bearing 14 at its forward end for this shaft. The bracket 13 preferably comprises a casting of a somewhat V-shape, as shown in Fig. 4, and having suitable ribs for strengthening the same. This plate or bracket is formed so that it may be attached directly to the base 6 of the engine. In the present instance it is bolted thereto by means of bolts or cap screws 15. It is also further supported or held by the bolts or screws 16 which hold the frame and support 7. On account of having this bracket rigidly secured to the engine, it forms an accurate support for the bearing 14, and the bearing will not be thrown out of alinement by any twisting or strains on the automobile frame. Furthermore, the bearing and bracket being of a rigid construction and securely attached to the engine base, there will be little or no vibration when the car is being driven.

The forward end of the shaft 10 is provided with means for transmitting power, such as the pulley 17. The forward end of the pulley is provided with notches 18 for receiving the starting crank 19, which is applied in the manner shown.

Instead of extending the power attachment for some considerable distance beyond the automobile frame, I prefer to make it short and turn the front wheel, as shown at 20, so that the belt 21 may be applied to the pulley 17 and directed at right angles to the center line of the automobile, without interfering with the wheel. In most instances, this can be readily done by removing a pin from the steering knuckle. If this cannot be conveniently done, the front wheel may, of course, be removed and a support provided for the axle.

Where the capacity of the automobile fan cannot be conveniently increased, I provide a larger or auxiliary fan in front of the radiator 22. A fan supporting frame and protecting guard are formed by attaching an angle or bar 23 to the bracket 13 and securing uprights 24 thereto. The uprights are connected at their upper ends by a channel 25 which is bent at the ends and attached to the radiator 22. The fan 26 is mounted on a cross bar 27 and is provided with a driving pulley 28 which is driven by belt 29 from one end of the pulley 17. By means of this arrangement, a large fan may be used and a sufficiently large driving belt applied thereto so that any desired amount of air may be forced through the radiator. The supporting frame for the fan also provides a protection or guard for the same.

It will be readily understood from the above description that I provide an exceedingly compact and serviceable attachment for automobiles whereby the power of the engine may be utilized for driving machinery or the like, and sufficient cooling means is provided for cooling the engine when the automobile is stationary or moving at a slow speed. On account of the compact nature of this attachment and on account of the bracket being secured directly to the engine bed, there will be little or no vibration of the attachment when the car is being driven as an automobile and it will, therefore, not be necessary to detach the device when the car is to be driven. It will be observed that changes may be made in the details of construction without departing from the scope of this invention and, therefore, I do not wish to limit myself to the exact construction, but claim the following as my invention:

1. An attachment for automobiles comprising a bracket secured directly to the base of the automobile engine and extending forwardly beyond the frame and having a bearing at its forward end, and an auxiliary shaft secured to the engine shaft and extending out through said bearing and means engaging with said auxiliary shaft beyond the bearing for transmitting power.

2. The combination with an automobile having an engine, of a bracket rigidly secured to the engine and extending forwardly beyond the frame and having a bearing at its forward end, a shaft rigidly connected with the driving shaft of the engine and extending out through said bearing, and means for transmitting power secured to the forward end of said shaft.

3. The combination with an automobile having an engine, of a V-shaped bracket rigidly secured to the engine and projecting forwardly beyond the frame and provided with a bearing at its forward end, an auxiliary shaft coupled to the driving shaft of the engine and extending out through said bearing, a pulley secured to the forward end of said shaft, said pulley having notches in the end thereof, and a starting crank engaging with said auxiliary shaft and adapted to engage with said notches for turning the shaft.

4. The combination with an automobile having an engine, of a rigid bracket formed of a single piece and securely fastened to the engine, said bracket extending forwardly beyond the engine frame and provided with an integrally formed bearing, a shaft connected with the driving shaft of the engine and extending out through said bearing, a frame connected with said bracket in advance of the radiator, a fan mounted on said frame, and means for driving said fan from said shaft.

5. An attachment for an automobile comprising a bracket formed of a single casting and adapted to be secured directly to the base of the engine, a combined supporting frame and fan guard secured to said bracket, an auxiliary shaft having a bearing in said bracket, a pulley for said shaft, a fan mounted in said frame, a pulley for driving said fan, and a belt connecting said pulleys.

6. The combination with an automobile having an engine, of a bearing member rigidly secured to said engine and extending out beyond the frame with a bearing in advance of the frame, an auxiliary shaft connected to the crank shaft of the engine and extending out through said bearing, a power pulley mounted on said auxiliary shaft, a combined fan supporting frame and guard connected to said bearing member in advance of the radiator, a fan mounted in said frame, a pulley for said fan, and a driving belt connecting said pulleys.

GEORGE S. JACOBS.